INVENTORS
Frans Brouwer
Francis G. Bardwell

By William J. Newman

Attorney

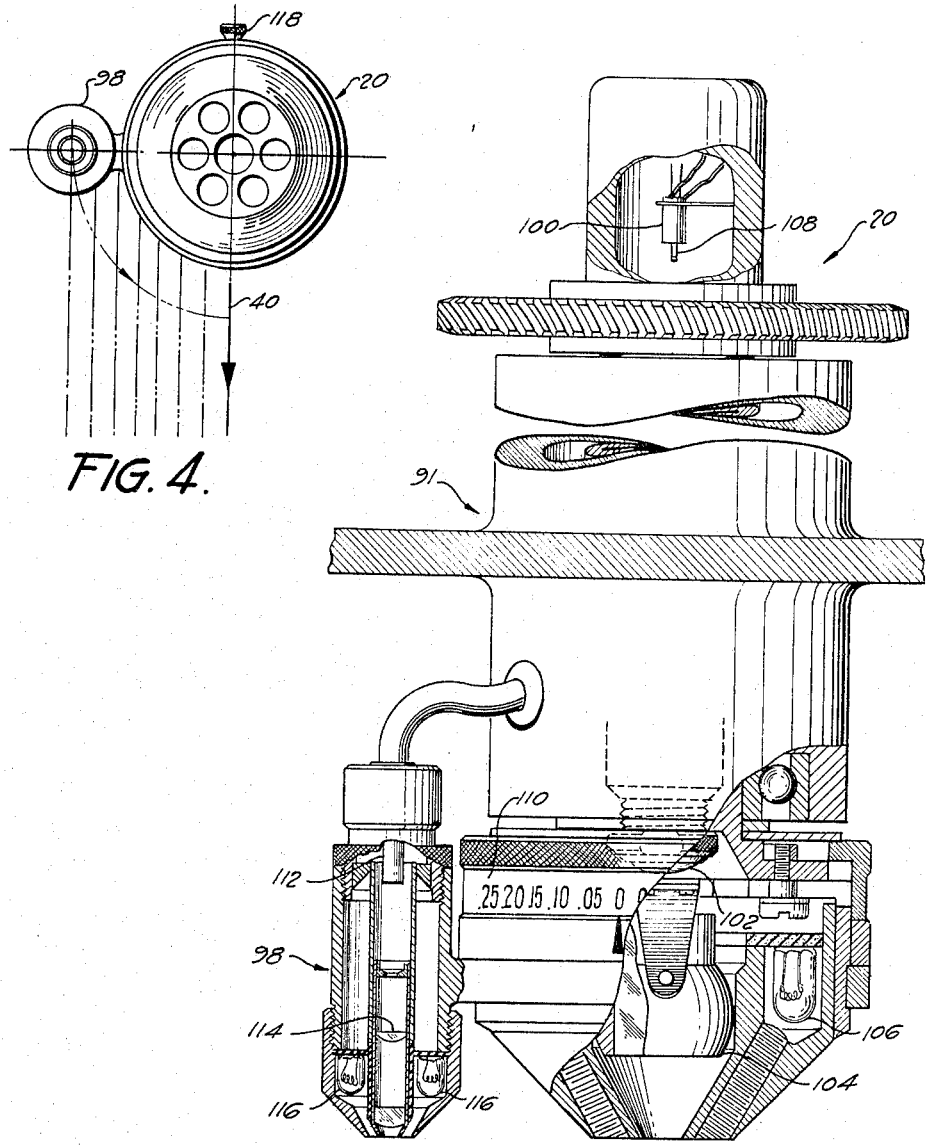

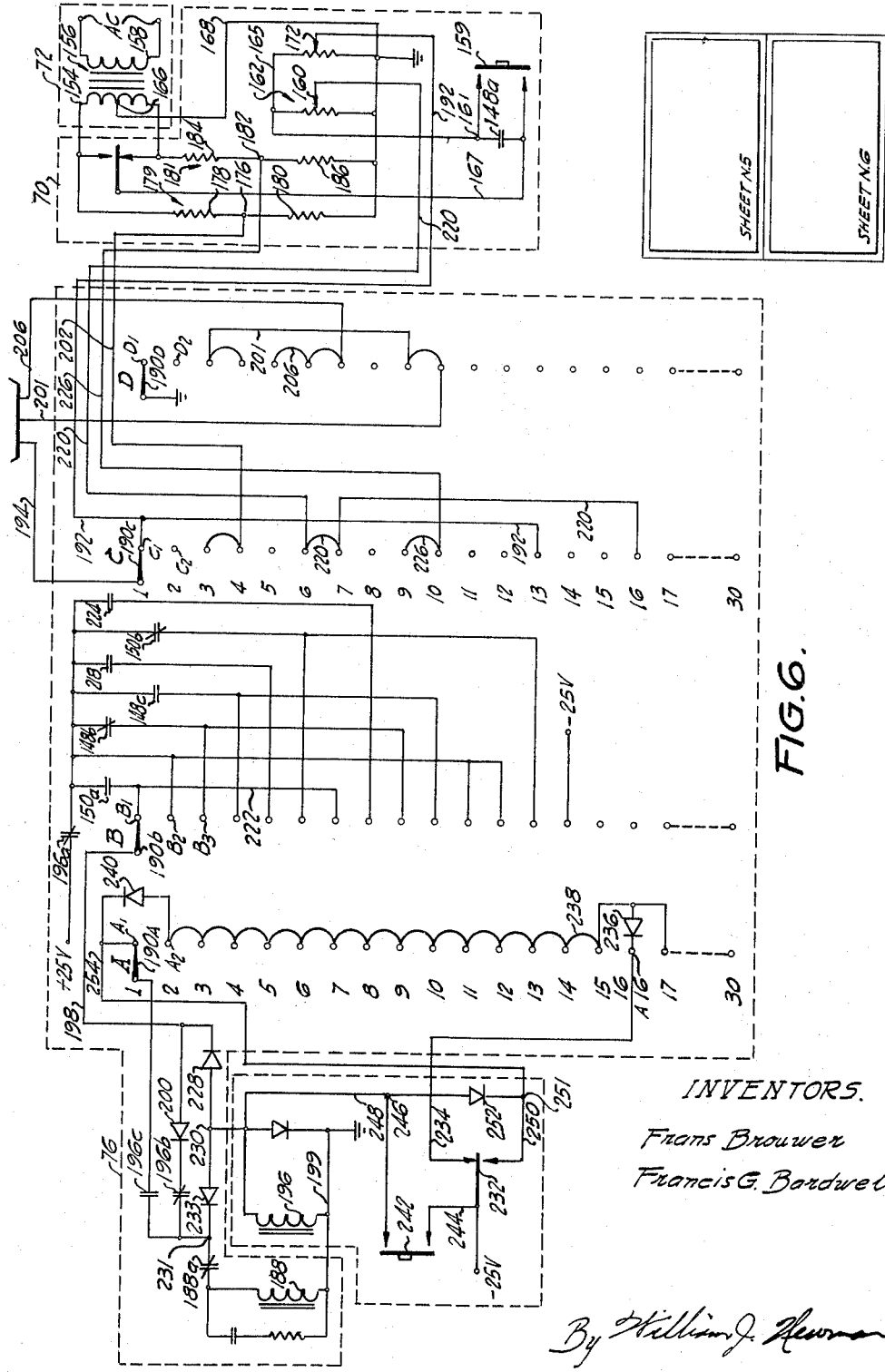

INVENTORS
Frans Brouwer
Francis G. Bardwell

By William J. Newman
Attorney

INVENTORS
FRANS BROUWER
FRANCIS G. BARDWELL

FIG. 11.

INVENTORS
Frans Brouwer
Francis G. Bardwell

By William J. Newman
Attorney

United States Patent Office 3,289,540
Patented Dec. 6, 1966

3,289,540
AUTOMATIC CONTOUR TRACER PROGRAMMING
APPARATUS AND METHODS
Francis G. Bardwell, Chicago, and Frans Brouwer, Glencoe, Ill., assignors to Stewart-Warner Corporation, Chicago, Ill., a corporation of Virginia
Filed Apr. 16, 1965, Ser. No. 448,605
20 Claims. (Cl. 90—13.5)

This invention relates to contour tracing apparatus of the type useful for guiding work tools such as milling cutters, wood shapers, gas torches, and the like for shaping workpieces in accordance with desired patterns. More particularly, this invention relates to the automatic programming of such devices in order that complex patterns may be traced without constant attendance of an operator.

It is often desirable to fabricate a product having a number of separate closed loop designs, such as for example an open lattice type door for fancy furniture. It is also often desirable to fabricate a number of separate and different shaped objects from a single workpiece in order to make maximum utilization of the product material. At the present time an operator must manually program a machine to cut each separate design or shape in a single workpiece. He is therefore limited in the number of machines he can control and his efficiency is relatively poor. Utilizing the present invention an operator can set his machine once to automatically trace all of the desired shapes and designs from a workpiece. While that machine is operating he may tend to other functions such as loading and unloading other machines.

The automatic systems hereinafter described relate not only to line followers but also to edge followers and combination line end edge followers. It is to be understood, however, that the basic principles of this invention may be applicable to any other tracing techniques.

It is therefore an object of this invention to provide methods and apparatus for automatically tracing complex patterns.

It is also an object of this invention to provide methods and apparatus for automatically shaping workpieces in accordance with complex patterns comprising one or more separate design contours.

Another object of this invention is to provide methods and apparatus for tracing one or more different types of indicia to follow along a complex pattern.

A further object of this invention is to provide automatically controlled tracer apparatus of the edge tracer, line tracer or combination edge tracer and line tracer type for cutting complex patterns in a workpiece.

Briefly this invention is embodied in a method and apparatus whereby a pattern guide having contour indicia forming a desired pattern, lead indicia forming a travel guide to and from the contour indicia and a code mark are traced by a tracing device. The tracing device is caused to automatically follow along said indicia until a code mark is detected. Detection of the code mark causes the tracing device to transfer from one type of indicia to the other type of indicia. Thus, the device may be started to trace along a lead indicia which brings it adjacent a contour indicia at which point there is a code mark. Detection of the code mark causes the transfer of the tracer from the lead indicia to the contour indicia. The tracer is again started to travel in a forward direction around the contour indicia to trace the pattern formed thereby. In a preferred embodiment the work tool may be enabled to cut the desired pattern formed by the contour indicia as the tracer follows thereabout. If the contour indicia is in the form of a closed loop the tracer redetects the code mark upon completion of its path around the pattern, and the tracer is caused to shift from the contour indicia back to the lead indicia, at the same time disenabling the work tool. Upon reaching the lead indicia forward motion is again instituted to proceed to the next portion of the pattern to be fabricated.

This invention will be better understood with a further reading of the specification, especially when taken in view of the following drawings in which:

FIG. 3 is an elevation, partially in section, of a tracer including the scanning head and a code mark detector;

FIG. 4 is a bottom view of the tracer shown in FIG. 3;

FIG. 6 is a schematic of the remaining portion of the electronic circuit shown in FIG. 5;

FIG. 7 is a diagram indicating the interrelationship of FIGS. 5 and 6;

FIG. 11 is a schematic diagram of the remaining portion of the electronic circuit shown in FIG. 10;

Figure 1:
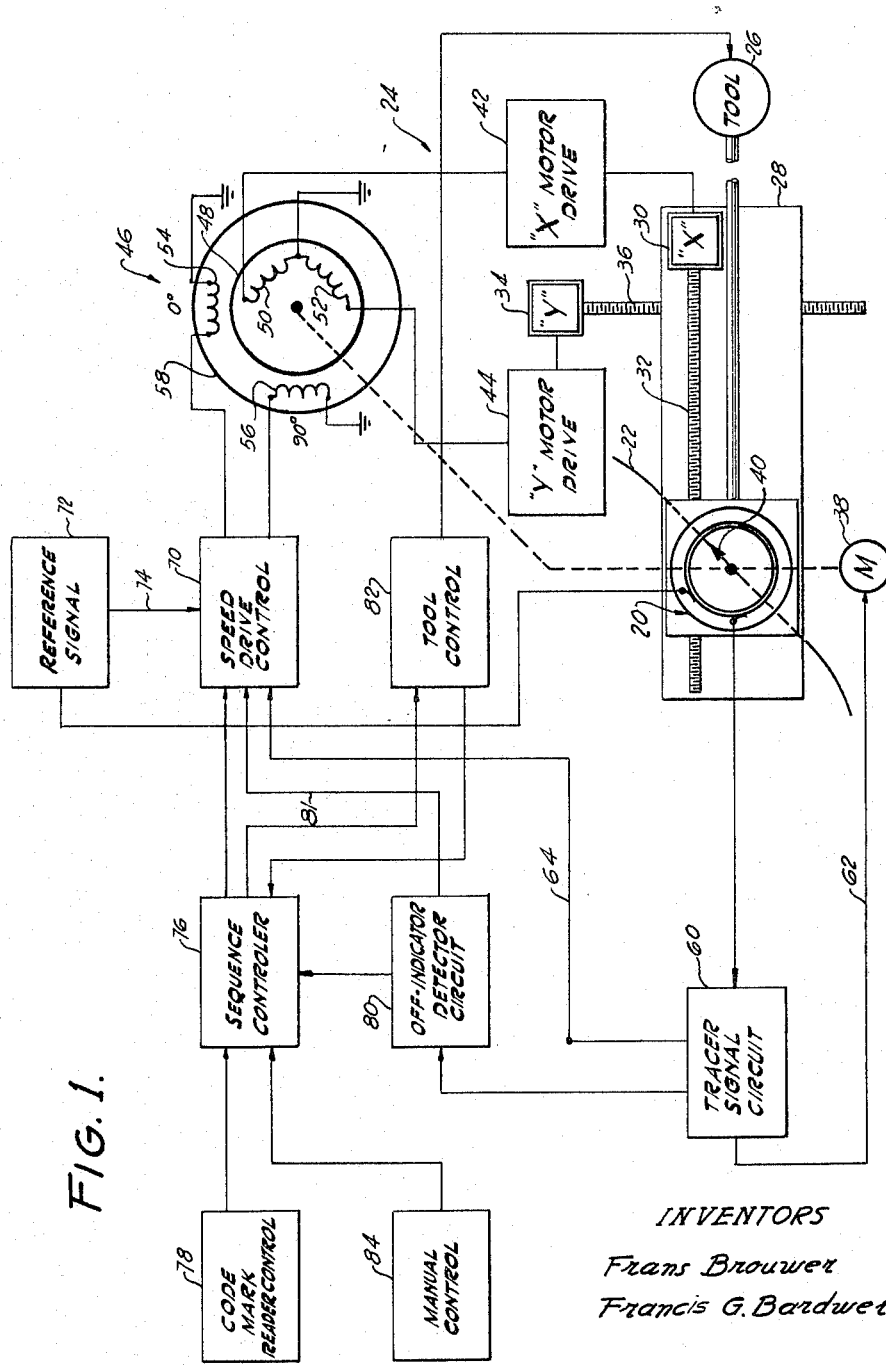
FIG. 1 is a schematic block diagram of a tracer system including an automatic programming control in accordance with this invention.

As shown in FIG. 1 a tracer system embodying the teachings of this invention comprises a scanning head 20 which optically views a pattern indicia 22 which may be in the form of a line or an edge as hereinafter described. The scanning head 20 produces electrical signals in accordance with its position with respect to the indicia 22 which are utilized to energize drive apparatus 24 to move the scanning head 20 along the indicia 22. A work tool 26 is mechanically or electrically connected to the scanning head so that its movements are guided by the motion of the scanning head.

In the preferred system as shown in FIG. 1, the drive apparatus 24 for moving the scaning head 20 is a coordinate drive system in which the scanning head is mounted on a carriage 28 and is movable therealong by means of a servo motor 30 (hereinafter referred to as the "X" motor) and lead screw 32. The carriage 28 is movable in a direction 90° transverse to the motion of the scanning head 20 on the carriage by means of a servo motor 34 (hereinafter referred to as the "Y" motor) and lead screw 36. Thus, the scanning head 20 has universal movement with respect to support means (not shown) for the pattern containing the indicia 22.

The scanning head 20 is also rotatably translatable with respect to the carriage 28 by means of a servo motor 38 so that the front-to-back axis, indicated by arrow 40, may be properly aligned with respect to the direction of the indicia 22.

The X and Y motors 30 and 34 are energized through motor drives 42 and 44, respectively, by a resolver 46 which has its rotor 48 linked with the scanning head 22 to rotate therewith. As is well known, the rotor windings 50 and 52 which control the X and Y motors 30, 34, respectively, are energized in accordance with the resultant of a speed signal at the speed winding 54 and a transverse signal at the transverse winding 56 of the resolver stator 58.

The signals for energizing the rotational motor 38 and for applying to the resolver transverse winding 56 are developed in a tracer signal circuit 60 which may be of the type disclosed in U.S. Letters Patent 3,213,282 issued October 19, 1965, to Frans Brouwer. The tracer signal circuit 60 provides a rotational signal directly to the rotational motor 38 through conductor 62 and a positional signal to the resolver transverse winding 56 through conductor 64 and a speed drive control circuit 70. The speed reference signal is also provided to the speed winding 54 of the resolver from the reference signal source 72 through the speed drive control 70.

The speed drive control 70 governs the energization of the resolver 46 and hence the positional movement of the scanning head 20 in accordance with the automatic programming features of this invention. The speed drive control 70 is actuated by a sequence controller 76 which receives information from a code mark reader control 78 and an off indicia detector circuit 80 as will be described in more detail hereinafter. The off indicia detector circuit 80 also provides its normal function of removing the speed drive signal to the speed winding 54 of the resolver when the scanner 20 strays off of the indicia 22 to stop the movement thereof as indicated by conductor 81. The sequence controller 76 also actuates a tool control 82 which enables the tool 26 to perform its operation on a workpiece at the proper time. Manual control means 84 are also provided to override the automatic programming sequence as will also be hereinafter described.

Figure 2:
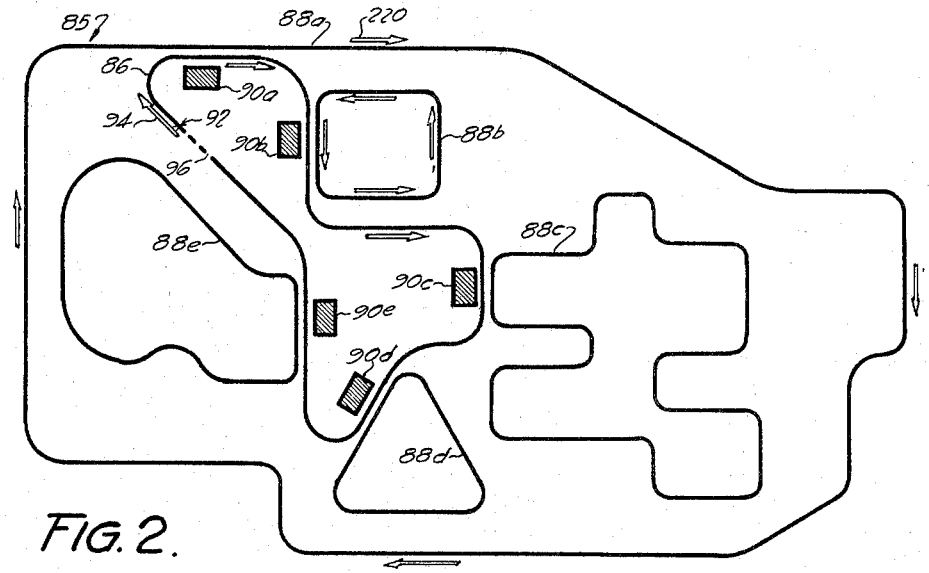
FIG. 2 is a plan view of one type of pattern which may be used in the practice of this invention.

FIG. 2 shows one type of pattern 85 which may be utilized in the practice of this invention. It comprises a lead indicia 86 and contour indicia 88a, 88b, 88c, 88d and 88e, all formed of thin lines. This pattern design is utilized when it is desired to use only line tracing techniques such as disclosed in U.S. Patent No. 2,489,305, issued to Miles A. McLennan on November 29, 1949, and the Brouwer U.S. patent hereinbefore mentioned. The pattern 85 also includes code marks 90a, 90b, 90c, 90d and 90e which provide the indicators for causing the scanning head 22 to transfer from one type of indicia to another.

In the automatic programming techniques of this invention the tracer is caused to follow along the pattern in the following manner. The scanning head is placed over the lead indicia 86 at a beginning point, for example, as indicated at 92 and is caused to follow the lead indicia in a forward direction as indicated by arrow 94. When the tracer approaches the first code mark 90a it is caused to stop and shift to the left from the lead indicia 86 to the first contour indicia 88a. When the scanning head is properly positioned over the contour indicia 88a the work tool 26 is actuated and the tracer caused to begin forward movement therealong. If desired the forward speed along the contour indicia may be different than that along the lead indicia 86, and is preferably slower so that the work tool may properly perform its function. The tracer travels completely around the contour 88a until code mark 90a is again detected. Forward movement is stopped, the work tool 22 is deactuated and the tracer caused to move to the right until the scanning head again picks up the lead indicia 86. When it is properly positioned thereover, forward movement is again started and the tracer moves along the lead line 86 towards the second code mark 90b. The tracer is again automatically stopped, moved to the left to pick up contour indicia 88b. Leftward movement is stopped, the work tool is enabled and forward movement around the contour is again initiated. A redetection of the code mark 90b after tracing around contour indicia 88b stops the tracer, disables the work tool and causes the tracer to move to the right to pick up the lead indicia 86 and travel on to the next contour indicia 88c.

This sequence is continued completely automatically to trace the contour indicia 88d and 88e, and as many others as are desired. However, when the scanning approaches a break 96 in the lead indicia 86 the tracer is stopped, indicating the completion of the program sequence. A new workpiece may be positioned with respect to the work tool 22, the tracer moved to the starting point 92 on the pattern and the whole sequence started over again.

FIGS. 3 and 4 depict a tracer 91 adapted for use with this invention. It comprises the scanning head 20 and a code mark detector 98. Scanning head 20, as shown in FIG. 3 may be of the type described in detail in the copending application Serial No. 344,107, filed February 11, 1964, of Brouwer and Sobchak, and hence will not be described in detail. Briefly however, it comprises a photosensitive device 100 upon which an image of the pattern is cast by means of a lens 102 and a light conducting glass or plastic block 104. The pattern indicia is illuminated by means of lamps 106, only one of which is shown in FIG. 3. In this particular embodiment a vibrating opaque shade 108 modulates the image appearing on the photosensitive device 100 when the scanner is following along a thin line. However, when the device is following along a contour formed of the edge between two contrasting colors, the vibrating shade 108 is deactivated and the image is modulated by periodic interruptions of the lamps 106 in a manner described in the copending U.S. application of Derek H. Redman, Serial No. 461,605 filed May 27, 1965, a continuation of application Serial No. 144,287, filed October 9, 1961, now abandoned. Kerf compensation adjustment means are also provided at 110 in accordance with the teachings of the aforementioned Brouwer-Sobchak application.

Figure 5:
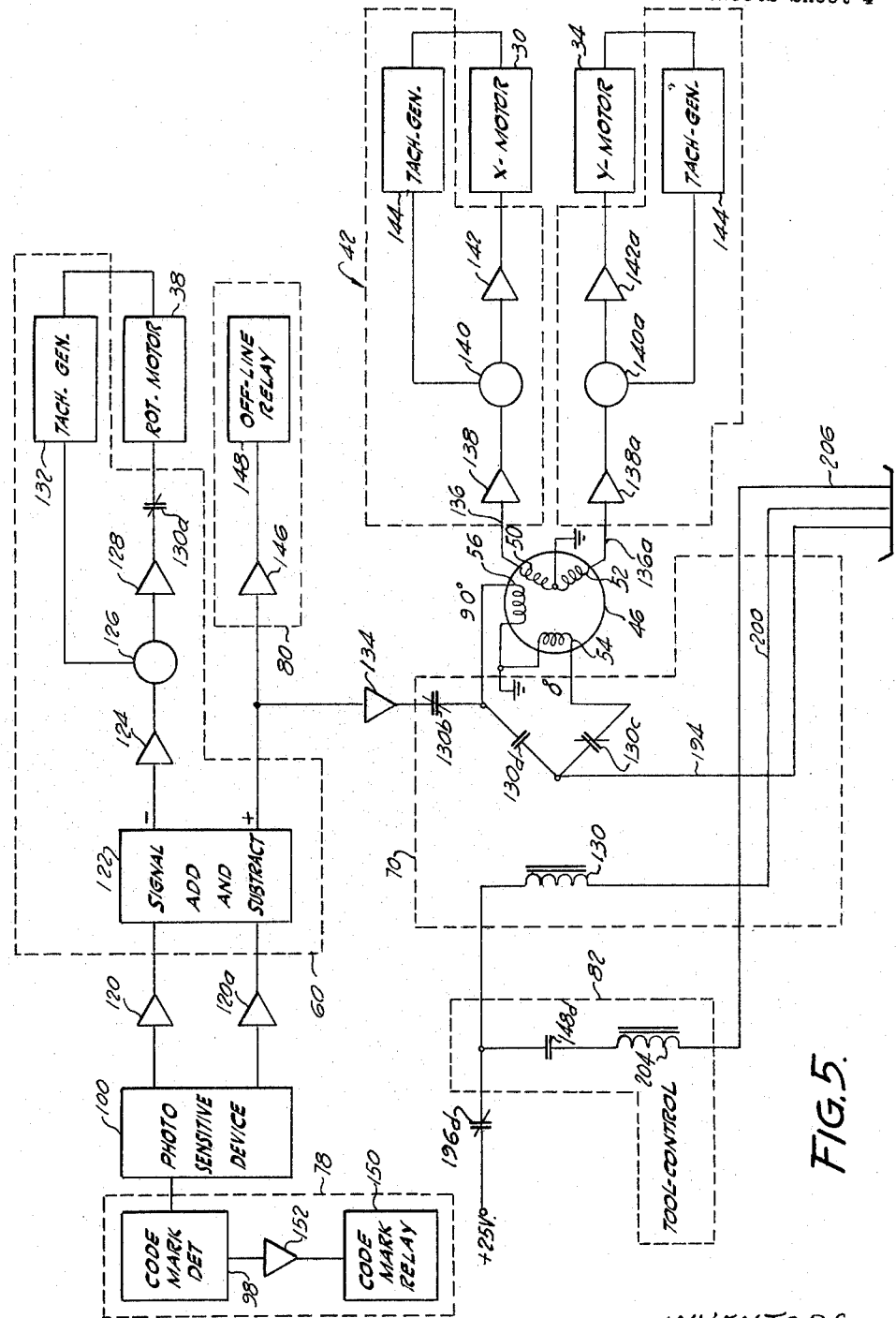
FIG. 5 is a schematic diagram of a portion of the electronic circuit for one embodiment of the invention.

The code mark detector 98 is attached to the scanning head 20, or may be formed integral therewith if desired. It comprises its own photosensitive device 112, optical means 114 and illuminating lamps 116. The photosensitive means 112 produces an electric signal responsive to the detection of a code mark 90 on the pattern to actuate a code mark relay 150 in the code mark reader control 78 (FIGS. 1 and 5). If desired the code mark detector 98 may be made angularly adjustable with respect to the front-to-back axis 40 of the scanning head 20 to adjust for the position of the code marks 90 with respect to the lead indicia 86 and the contour indicia 88 on the pattern.

Reference is now made to FIGS. 5 and 6 which may be adjoined in the manner shown by FIG. 7 for the following description of the circuits for the automatic program pattern tracer utilizing a thin line for the lead indicia and thin lines for the contour indicia.

In this embodiment the photosensitive device 100 comprises two photocells which simultaneously view different segments of the line in accordance with the aforementioned Brouwer applicaition Ser. No. 61,596. The two outputs therefrom are fed through respective amplifiers 120, 120a to an add and subtract circuit 122. One of the outputs of the add and subtract circuit 122, in this case the subtract signal, is fed through amplifier 124, signal mixer 126, amplifier 128, and normally closed contacts 130a of line transfer relay 130 to the rotational motor 38. A tachometer generator 132 is mechanically driven by the rotational motor 38 and the signal generated thereby is mixed with the difference signal in the mixer 126 in a well known manner to provide stiffness to the system. Thus, the rotational motor 38 operates responsive to the angular deviation of the front-to-back axis 40 of the scanner 20 with respect to the pattern line as represented by the difference signal to drive the scanner into angular alignment therewith. The resolver rotor 48 is also rotated with the scanner 20 to provide the proper speed signals to the X and Y motors for driving the tracer along the line indicia at a contsant speed.

The transverse signal for the resolver 46 is obtained from the additional signal output of the adder and subtracter circuit 122, and is conducted through amplifier 134, contacts 130b of the line transfer relay 130 to the transverse resolver winding 56. The speed signal supplied to the speed signal resolver winding 54 is provided through a circuit to be later described. The two outputs of the resolver from the rotor windings 50, 52 (FIG. 1) are transmitted through conductors 136, 136a, amplifiers 138, 138a, signal mixers 140, 140a, amplifiers 142, 142a to the X motor 30 and Y motor 34, respectively. The tachometer generators 144, 144a provide stiffness as hereinbefore described.

The addition signal output of the adder and subtracter circuit 122 is also utilized to control the off indicia detector 80 which comprises amplifier 146 and offline relay 148. The offline relay 148 is adapted to be energized when the photosensitive device 100 views a line and deenergized if the scanner 20 strays off the line so that no image thereof appears on the photosensitive device 100. The operation of the contacts associated with the offline relay 148 will be described hereinafter in the description of the automatic program sequencing circuits.

The automatic program sequencing is accomplished by the interaction between the code mark reader control 78, the off indicia detector 80, the speed drive control 70 and the sequence controller 76 (FIG. 6). The code mark reader control comprises the code mark detector 98 (FIGS. 3 and 4) and the code mark relay 150 which is driven by the code mark detector 98 through amplifier 152. The code mark relay 150 is adapted so that it is energized upon detecting a code mark and deenergized when not viewing a code mark. The operation of the various code mark relay contacts will be described hereinafter in the description of the automatic program sequencing circuits.

The speed drive control circuit 70 (FIGS. 5 and 6) provides the different signals for application to the resolver for causing movement of the tracer in the desired direction and at the desired speed.

The contour tracing speed signal is developed at the wiper 160 of a speed control potentiometer 162 in speed drive control circuit 70. The resistance element 164 of the potentiometer 162 is connected from the grounded center tap 166 of the transformer secondary 154 to a selected one of the ends of the transformer secondary 154 through the circuit including center tap 166, conductor 168, potentiometer resistance element 164, conductor 165, junction 161, manual override switch 159, conductor 167 and reversing switch 170 to either end of transformer secondary 154. Contacts 148a around the manual override switch 159 do not close until the scanner 20 views a line to energize offline relay 148. Thus, the manual override switch 159 is used to move the scanning head to the lead line of the pattern whereat the offline relay 148 energizes to close contacts 148a and lock the speed drive signal on at potentiometer wiper 160. The contour tracing speed signal appearing on the wiper 160 is delivered through the sequence controller 76 to the speed winding 56 of the resolver 46 in a manner to be hereinafter described.

A lead indicia following signal is provided at wiper 172 of potentiometer 174 in speed drive control circuit 70 which is connected in parallel with the contour tracing signal potentiometer 162. Thus, a different speed may be utilized when tracing the lead indicia and preferably this speed is faster than that used for contour tracing. The offline relay contacts 148a and reversing switch 170 provide the same functions as hereinbefore described for the tracing speed signal. The speed drive control 70 also provides signals for moving the tracer to the right or to the left to shift from one type of indicia to the other as hereinbefore mentioned. The drive left signal is provided at the output 176 of a voltage divider 179 comprising resistors 178 and 180. The drive right signal is provided at the output 182 of the voltage divider 181 comprised of resistors 184 and 186. The voltage dividers 179 and 181 are respectively connected between ground conductor 168 and opposite sides of the transformer secondary 154. The drive left and drive right signals appearing at outputs 176 and 182 respectively are connected through the sequence controller 76 to the resolver transverse winding 54 in a manner to be hereinafter described. During these operations no signal appears on speed winding 56 of the resolver so that the tracer has no forward motion with respect to the pattern indicia as will be hereinafter described.

The sequence controller 76 comprises a stepping switch which is activated to move from step to step by signals received from the code mark reader control 78, the off indicia detector 80 and the tool control circuit 82. The stepping switch has a stepping coil 188, interrupter contacts 188a, and four banks of contacts indicated A, B, C and D. The stepping coil 188 is pulsed through circuits, to be hereinafter described, to move the respective wipers, 190a, 190b, 190c and 190d in a sequential manner to the step levels 1 through 30. Bank A of the stepping switch sequence controller 76 controls the manual reset of the switch and will be described later. Contact bank B is utilized to control the stepping operations of the switch, providing the pulses therethrough for the stepper coil 188. Contact bank C makes the appropriate connections for the desired drive signals between the resolver 46 and the speed drive control 70. Contact bank D controls the operation of the tool control circuit 82 and the line transfer relay 130 (FIG. 5). The remainder of the sequence controller 76 can best be described by a description of the operation of the system.

It is first assumed that the power is turned on so that an A.C. signal appears across the primary 158 of transformer 156, illuminating lamps 106 and 116 (FIG. 3) are energized and the opaque shade 108 is vibrating to modulate the image viewed by the photosensitve means 100. If the pattern in FIGURE 2 is to be traced the tracer must be moved to the start point 92 on lead line indicia 86. Manual override button switch 159 (FIG. 5) is therefore actuated to close the circuit placing the contour signal and lead signal potentiometers 162, 174, respectively, across one-half of the transformer secondary 154 by the circuit previously described. The signal at potentiometer wiper 172 is provided through conductor 192 to stepper switch contact C1. The lead signal is conducted through wiper 190c, conductor 194 and normally closed contacts 130c of the line transfer relay 130 to the speed winding 54 of resolver 46. The resolver energizes the X and Y motors to cause movement of the scanner in the direction of the front-to-back axis 40. Steering of the tracer towards the beginning point 92 is manually controlled until the lead line 86 is detected by the scanner, at which time the offline relay 148 energizes to close contacts 148a (FIG. 6) which close the circuit around 159 and it may be released.

The tracer 91 follows the lead line 86 in a normal manner with the subtract signal from adder and subtracter circuit 122 providing energization to the rotational motor 38 and the sum signal providing energization to the X and Y motors through the transverse winding 56 of the resolver 46. The rotational motor 38 thus aligns the front-to-back axis 40 of the scanning head 20 with the lead line 86 and the X and Y motors 30, 34 maintain the scanning head 20 properly positioned with respect to the line.

As the tracer follows along the lead line indicia 86 the stepping switch remains at step level 1 until the code mark detector 98 indicates its approach to the first code mark 90a. When the code mark 90a is detected code mark relay 150 is energized which closes contacts 150a (FIG. 6) to complete a circuit for energizing the stepper switch coil 188 leading from plus 25 v., through normally closed contacts 196a of manual set relay 196, code mark relay contacts 150a, stepper switch contact B1, wiper 190b, conductor 198, diode 200, manual reset relay contacts 196b, stepper switch interrupter contacts 188a, stepper switch coil 188 and ground conductor 199 to ground. After coil 188 is pulsed the interrupter contacts 188a open to cause the switch wipers 190a–190d to drop to step level 2.

At step level 2 the drive signal to the resolver is interrupted as wiper 190c of bank C no longer completes the circuit between the speed drive control 70 and resolver 46. Plus 25 volts is again placed on the stepper coil 188 through bank B contact B2 and wiper 190b over the circuit from the wiper as hereinbefore described. The switch wipers are thus advanced immediately to step level 3.

At step level 3 the line transfer relay 130 in the speed drive control 70 (FIG. 5) is energized through stepper switch bank D by the circuit leading from ground, switch wiper 190d, step level contact D3, conductor 200, line transfer relay 130, normally closed contacts 196d of the manual set relay 196 to plus 25 volts. Energization of line transfer relay 130 opens the circuit to the rotational motor 38 at contacts 130a and opens the circuit from the add and subtract circuit 122 to the resolver at contacts 130b. Contacts 130c open to remove the speed signal source from the speed winding 56 and contacts 130d are closed to connect conductor 194 from the speed drive control 70 to the resolver transverse winding 56. A signal is provided to the transverse winding 56 to drive the tracer to the left by a circuit leading from the drive left output 176 of the speed drive control 70 through conductor 202, step level contact C3, wiper 190c, conductor 194 and contacts 130d. The tracer thus begins moving to the left off of the lead line indicia 86 and towards the contour line indicia 88a. As the tracer moves to the left and the image of the lead line is lost to the photosensitive device 100, the offline relay 148 deenergizes to close contacts 148b in the stepper switch coil energization circuit between the plus 25 volt source and step level contact B3 of stepper switch bank B. The switch steps to level 4 and the drive left connections of banks C and D are maintained to keep the tracer moving left.

When the tracer has moved sufficiently to the left so that the photosensitive device 100 receives an image of the contour indicia line 88a the offline relay 148 is again energized and closes contacts 148c connected between step level contact B4 and the plus 25 volt source to step the switch to step level 5.

At step level 5 the circuit to the resolver 46 is opened at bank level D to stop the tracer movement. Bank level D opens the circuit to line transfer relay restoring contacts 130c and 130d to their normal condition. Bank D also completes the circuit to tool control relay 204 (FIG. 5) through the circuit from ground including wiper 190d, step level contact D5, conductor 206, tool control relay 204, offline relay contacts 148d and manual reset contacts 196c to plus 25 volts. The energization of tool control relay 204 enables a work tool to perform a desired operation on the workpiece.

The stepping switch is maintained at step level 5 until the work tool reaches its operative position or condition at which time limit switch 218 is closed to complete the circuit to the stepping coil 188 through contacts B5 of bank B. Stepping of the switch to level 6 places the contour tracing speed signal on the speed winding 54 of the resolver 46 through the circuit from contour tracing speed potentiometer wiper 160, conductor 220, step level contact C6 wiper 190c, conductor 194, line transfer relay contacts 130c to the resolver speed winding 54. The work tool is still maintained in its actuated state as ground is provided to the tool control relay 204 through bank D wiper 190b and conductor 206.

The tracer thus begins in a forward direction around the contour indicia 88a as indicated by arrow 220 of FIG. 2, and it is to be noted at this point that the code mark 90a is of sufficient size that the code mark detector 98 still views it when the scanning head is positioned over the lead indicia 96 or the contour line indicia 88. Thus, as the tracer begins movement along the contour line indicia 88a, code mark relay contacts 150b connected to bank B step level contacts B6 close when the code mark detector 98 leaves code mark 90a to step the switch to step level 7.

The tracer follows completely around the contour indicia 88a with the stepping switch at step level 7 so that the work tool, being at its actuated position, cuts the desired contour on the workpiece. As the tracer approaches its beginning position on the contour indicia the code mark detector 98 again detects code mark 90a which causes code mark relay 150 to again close contacts 150a. These contacts 150a are connected to step level contact B7 through conductor 222 and thus cause the stepping switch to step to level 8. Forward motion of the tracer is stopped by bank C of the switch which disconnects the speed signal from the resolver 46 and the circuit to the tool control relay 204 is opened at bank D. When the tool reaches its upper position limit switch contacts 224 close to complete the circuit between plus 25 volts and step level contact B8 to step the switch to level 9.

At level 9 bank D causes the reenergization of the line transfer relay 130 to open the circuit to resolver speed winding 54 and close the circuit to transverse winding 56 from the speed drive control 70. Bank C of the stepping switch provides a drive right signal from the speed drive control 70 to the resolver 46 leading from the drive right output 182 (FIG. 6) conductor 226, contact C9, wiper 190c in switch bank C, conductor 194, contacts 130d to transverse winding 56 of the resolver. When the scanning head loses the contour line 88a as it moves to the right contacts 148b close placing plus 25 volts on step level contacts B9 and stepping coil 188 to step the switch to step level 10.

The stepping switch stays at level 10 until the scanning head views the lead line indicia 86. Offline relay contacts 148c then close and step the switch to level 11. Drive signals are absent from bank C contacts C11 and no circuit is closed by bank D. Plus 25 volts is on contact B11, however, to step the switch to level 12. The same condition appears at level 12 so that the switch is immediately stepped to level 13.

At level 13 bank C provides the lead line tracing speed signal to the speed winding of the resolver by the interconnection of step level contact C13 with conductor 192 which leads to lead line speed signal output at 172 in the speed drive control 70 as previously described. The tracer thus begins forward movement along the lead line indicia 86 until the code mark detector 98 leaves the code mark 90a. Code mark relay 150 deenergizes to close normally closed contacts 150b and the stepping switch steps to level 14. Tracer movement is stopped by the removal of a speed signal at contacts C14 and recycling of the sequence controller takes place for preparation to repeat the above described sequence when the tracer approaches the next code mark 90b along the lead indicia 86.

Recycling begins at level 14 with the energization of reset relay 196 (FIG. 6) by the circuit from minus 25 volts, bank B step level contact B14, wiper 190b, conductor 198, diode 228, junction 230, reset relay 196 to ground. The energization of reset relay 196 closes contacts 196c to connect bank A wiper 190a to the stepping coil energization circuit. Reset relay contacts 196a and 196b in the bank B stepping coil circuit as well as contacts 196d connected to the tool control relay 204 and line transfer relay 130 are all opened to prevent false operation of the respective circuits.

The stepping switch coil 188 is energized at level 14 by minus 25 voltage through the circuit from the minus 2˜ volt source (FIG. 6), cycle selector switch 232, conductor 234, bank A step level contact A16, diode 236, conductor 238, step level contact A14, wiper 190a, reset relay contacts 196c, junction 231, step coil interrupter contacts 188a, stepper coil 188, and conductor 198 to ground. This circuit also provides a hold for reset relay 196 which is connected between junction 231 and ground through diode 233.

The switch is thus stepped to level 15, and, since minus 25 volts appears at step level contacts A15 through A30, it continues to step to level 16 and onward through the remaining levels, back to level 1. Minus 25 volts is prevented from reaching bank A step level contact A1 by diode 240 thus stopping the stepping switch at the first level. Reset relay 196 is therefore deenergized, opening contacts 196c and reestablishing normally closed contacts 196a, 196b and 196d.

Lead in speed drive signal is provided to the resolver speed winding 54 through bank C of the stepping switch at step level 1 to cause the tracer to follow along the lead line 86 towards the next code mark 90b. The sequence controller is thus ready to cut the next pattern contour.

The sequence controller can be manually reset to the step level 1 position from any other step level position merely by actuation of manual reset button 242 (FIG. 6). Switch 242 places minus 25 volts on the reset relay coil through the circuit from minus 25 volts, conductor 244, switch 242, junction 246, conductor 248, and reset relay coil 196 to ground. Contacts 196c are closed thereby to connect bank A switch wiper 190a to the stepping coil circuit and contacts 196b are opened to remove bank B wiper 190b therefrom. Thus, the stepping switch cycles back to position 1 in the manner as previously described.

The system is also operable in a normal line tracing mode without the automatic programming feature. This is accomplished by changing the cycle selector switch 232 to the non-cycle position which is opposite to the position shown in FIG. 6. Minus 25 volts is thus placed on the reset relay 196 from the minus 25 volt source through switch 232, conductor 250, junction 251, diode 252, junction 246, conductor 248 and reset relay 196 to ground. Bank B is disconnected and bank A is connected to the stepper coil energization circuit by the reset relay contacts 196b and 196c, respectively. Minus 25 volts is also placed on the bank A step level contacts A1 through A15 through the circuit from minus 25 volts switch 232, conductor 250, junction 251, conductor 254 and diode 249. Switch bank A wiper 190a is connected to the stepper coil 188 through contacts 196c and the stepping switch automatically steps down to step level 16. It stops there because diode 236 prevents minus 25 volts from appearing on contact A16. Contour tracing speed is connected from the speed drive control 70 to the speed winding 54 of the resolver 46 through step level contact C16 and bank C wiper 190c and the tracer may now be operated in a normal manner as described in the aforementioned prior art.

To return to automatic programming operation the cycle selector switch 232 is returned to the cycle position as shown in FIG. 6 to place minus 25 volts on contact A16. The return of switch 232 to its cycle position breaks the circuit to reset relay 196 which is reenergized by closing the manual reset switch 242. The stepping switch steps through the remaining step levels 17 through 30 and back to the first level as previously described.

Figure 9:
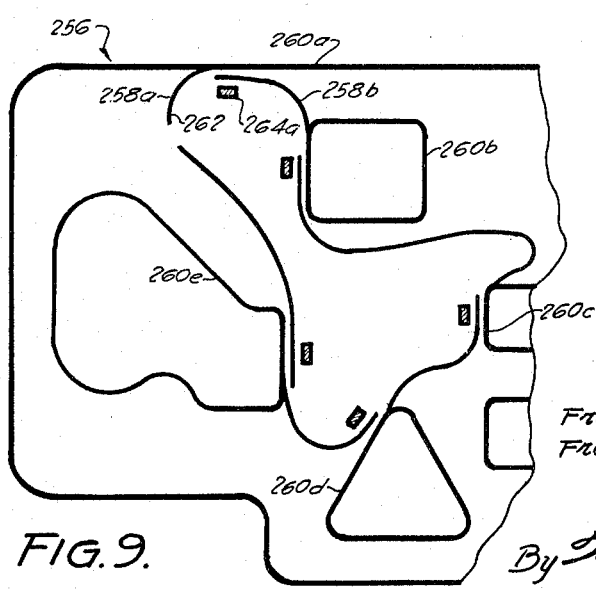
FIG. 9 is a plan view of another type of pattern which may be used in the practice of this invention.

The system of FIGS. 5 and 6 can also be used to trace a line pattern 256 such as shown in FIG. 9 by a minor modification of the circuit. As may be seen each of the lead line indicia 258 a through e merge directly into the respective contour line indicia 260a through 260e, so that the steps in the program sequence for moving the tracer to the left from the lead indicia to the contour indicia may be eliminated. Thus, step levels 3 and 4 of the sequence controller stepping switch 76 may be eliminated so that the switch would go directly from function step 2 to the functions of step 5.

Briefly the sequence would be as follows. The tracer is placed over the beginning point 262 and follows along the lead line 258a at lead line speed until the code mark detector 98 detected the first code mark 264a. The apparatus stops over the contour line 260a and the work tool is enabled to cut the pattern in the workpiece. Enabling of the tool causes contour tracing speed to be provided to the resolver and the tracer follows around the contour line indicia 260a until the code mark detector again detects code mark 264a. The tracer stops, the tool disables and movement to the right is initiated to again seek the lead line indicia 258b in a manner identical to that previously described.

Figure 8:
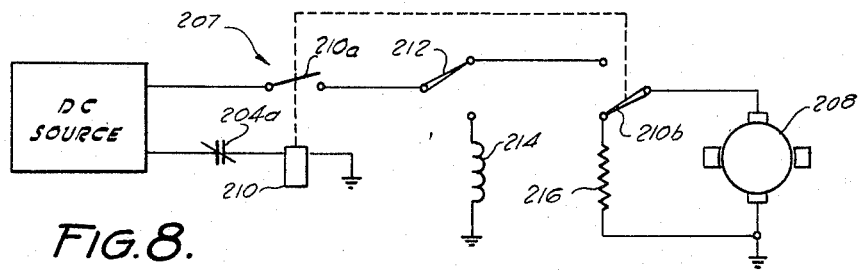
FIG. 8 is a schematic diagram of a work tool enabling circuit.

FIG. 8 shows a typical tool enabling circuit 207 which is operable at level 5 of the sequence switch to actuate a work tool. At level 8 it is operable to deactuate the tool. The circuit shown is specifically designed for use with a milling machine in which the milling cutter must be lowered to the workpiece. Assuming that the cutter is normally in its cutting position by the force of gravity, spring means or the like and the motor 208 is used merely to raise the motor to its non-operating position, the circuit will be in its shown condition before power is turned on with relay 210 deenergized and an up position limit switch 212 in its normally open position. The winding 214 is a brake coil to hold the tool in its up position when the limit switch 212 is actuated, and resistor 216 is used to limit the speed of descent of the cutter by providing a closed circuit for current generated by the unenergized motor as the tool descends by the force of gravity.

When power is turned on the relay 210 is energized through normally closed tool control relay contacts 204a thus closing contacts 210a and shifting contacts 210b to the power position for the motor 208. The tool is thus raised to its non-operating position, at which position limit switch 212 is shifted to place the braking coil 214 across the power source to hold the cutter at its upper position. This position will be held until contacts 204a are opened by the energization of the tool control relay 204 at step level 5 of the stepping switch 76. Relay 210 releases to deenergize the brake 214 and gravity pulls the tool down, resistor 216 controlling the speed of descent. Subsequent closure of contacts 204a again activates the motor 208 to raise the tool to its upper non-operating position. It is to be understood that other types of machines such as flame cutters may utilize the teachings of this invention and that other types of tool enabling circuits might be required. Thus, this explanation of a typical circuit for a milling machine cutter is not meant to limit the application thereto.

The teachings of this invention are also applicable to edge tracers such as the type described in the aforementioned Redman application. Reference is made to the schematic circuit shown in FIGS. 10 and 11 which may be arranged in the manner shown in FIG. 12 for best understanding.

Figure 13:
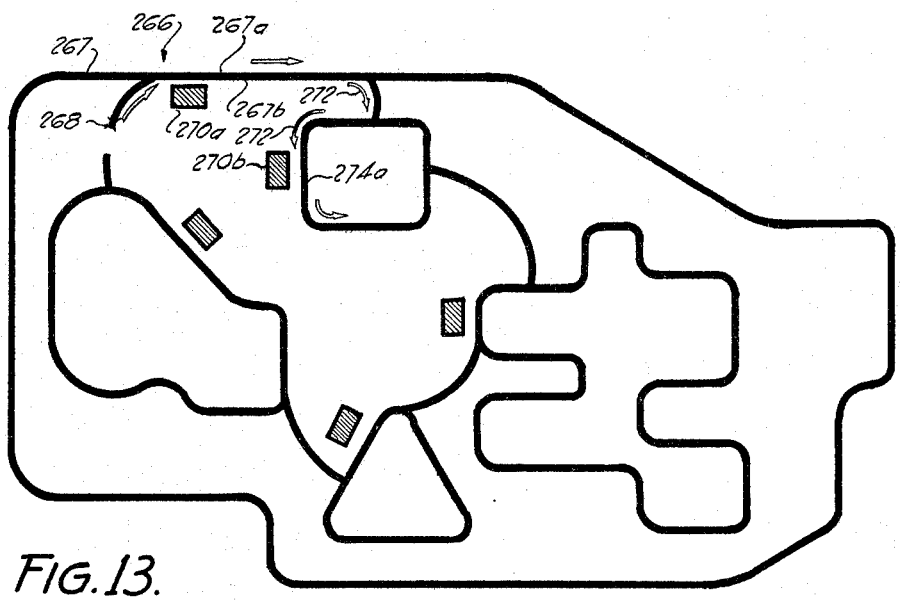
FIG. 13 is a plan view of a third type of pattern which may be utilized in the practice of this invention.
Figure 14:
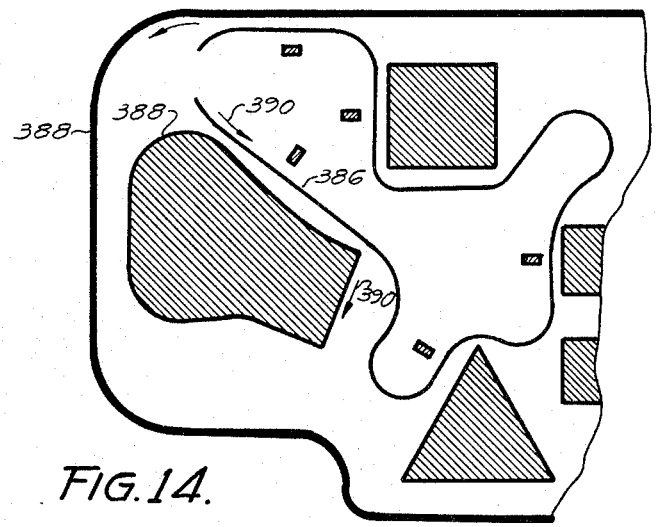
FIG. 14 is a plan view of a fourth type of pattern which may be utilized in the practice of this invention.

The system shown may be selectively used with the pattern shown in FIGS. 13 or 14. The pattern 266 shown in FIG. 13 comprises indicia formed of thick lines 267 which an edge tracer may follow on either edge 267a or 267b. In the particular pattern shown in FIG. 13 the right edge 267b is followed as the lead indicia and the left edge 267a is followed as the contour indicia. Thus, the tracer tracing the pattern 266 of FIG. 13 would begin at 268 and trace along the right edge 276b to code mark 270a. It stops and shifts to the left until the left edge 267a is detected. The tool is enabled and contour tracing speed applied to trace along the contour edge indicia 267a causing the work tool to cut a contour similar to that formed by the left edge 267a. When the code mark 270a is reencountered the tracer stops, the tool is disenabled and the tracer shifted to the right until right edge 267b is detected. Forward motion is again reestablished by applying lead edge indicia tracing speed to follow along the path of arrows 272 to the next code mark 270b where the sequence is repeated to trace and cut the contour formed by the contour indicia edge 274a.

This system also comprises a tracer 276 (FIG. 10) including a scanning head 278 and a code mark reader control 280. Provisions are made in the scanning head for line tracing as well as edge tracing because it is adaptable to trace the pattern of FIG. 14, as well be later described. For tracing the pattern of FIG. 13, however, the edge tracing techniques of the aforementioned Redman application are used in which lamps 282 which illuminate the pattern segment being viewed by photocell 284 are modulated by a reference signal. The lamps are energized through a circuit from a transformer 286 having an A.C. source connected to the primary, the circuit including either of contacts 288a or 288b of an edge selector relay 288 (FIG. 11), diode 290, normally closed contacts 292a of a lead line relay 292 and conductor 294. The lamps 282 thus flicker at the frequency of the A.C. source at the primary of transformer 286, said A.C. source being the reference for the complete system.

The fluctuating light causes the photocell 284 to produce a maximum output when it is viewing only a white background and a minimum output when it is viewing only a black background. Thus, if this signal is mixed with an oppositely phased signal of an amplitude midway between the maximum and minimum value the resultant thereof is indicative of the amount and direction of deviation of the scanning head from the indicia edge. The output from the photocell 284 is therefore transmitted through conductor 296, amplifier 298, lead line relay contacts 292b and amplifier 300 to a signal mixer 302. The amplified photocell signal is mixed at mixer 302 with the median amplitude reference signal supplied from transformer 304 through alternate contacts 288c, 288b. It is to be noted that the alternate contacts 288a, 288b and alternate contacts 288c, 288d are selected dependent on whether a right edge or a left edge is being followed. The operation of edge selector relay 288 will be discussed later in the description of the sequence.

As previously noted the phase and amplitude of the resultant signal appearing at the output of mixer 302 is indicative of the direction and amount of the deviation of the scanning head from the pattern edge. This output is supplied through amplifier 305, lead line relay contacts 292c, amplifier 306, junction 307, amplifier 308, contacts 310a of off indicia relay 310 and contacts 312a of edge transfer relay 312 (FIG. 11) to rotational servo motor 314 which is geared to the scanning head 278. The motor 314 thus steers the scanning head towards the pattern edge in a well known manner such as disclosed in the aforementioned Redman application. There is also a resolver 316 having a rotor geared to rotate with the scanning head 278 which resolves a speed signal applied to its speed winding 318 into X and Y coordinates for driving the X and Y motors 320, 322 respectively. The resolver 316 also has a transverse winding 319 to be used to drive the tracer right or left as hereinafter described. These motors drive the scanning head along the pattern edge in the well known manner previously described.

The speed drive control circuit 327 for providing the lead in speed signal, the contour traced speed signal, the drive left signal and the drive right signal is similar to the circuit 70 described for the system of FIGS. 5 and 6 and need not be described in detail here. The lead in speed signal is provided at the wiper 323 of potentiometer 324, the contour trace speed signal is provided at the wiper 325 of potentiometer 326, the drive left signal is provided at the output junction 328 and the drive right signal is ordinarily provided at output junction 330. The switches 332a and 332b in the drive left and drive right signal circuits are ganged to a lead in path selector switch 332 and are required for a purpose to be described with respect to the pattern of FIG. 14.

The code mark reader control 280 (FIG. 10) has a code mark detector 334 identical to that previously described which produces an output signal through amplifier 336 to code mark relay 338 to energize same upon detection of a code mark.

The off indicia detector circuit 340 (FIG. 10) which includes off indicia relay 310 operates responsive to the scanning signal appearing at junction 309 of the tracer signal circuit. For edge tracing the circuit 340 operates on the premise that there will be no signal at junction 307 when the scanning head is over the edge, but there will be maximum amplitude signal thereat if the edge is not being viewed and the scanner is over all black or an all white segment of the pattern. Thus, when the edge is being viewed by the scanning head, off indicia enabling relay 342 is deenergized and the circuit to off indicia relay 310 is completed from plus 28 volts through off indicia enabling relay contacts 342b, lead indicia relay contacts 292d and off indicia relay 310 to ground. When the scanning head strays off of the edge so that a maximum signal appears at junction 307, relay 342 is energized to break the circuit at contacts 342b to the off indicia relay 310. Thus, contacts 310a in the rotational motor circuit are opened and contacts 310b (FIG. 11) in the speed drive circuit are also opened to remove the drive signals from the resolver 316 in a manner similar to that of the first described embodiment.

The off indicia detector 340 and code mark reader control 280 cooperate to govern the functioning of a stepping switch sequence controller 344. The stepping switch is the same as previously described and includes a stepping coil 346 with interrupter contacts 346a and contact banks A', B', C', D' with their respective contact wipers 348a, 348b, 348c and 348d, all of which perform functions similar to the respective banks of the previously described stepper switch.

The position of the wipers 348a through 348d at the first step level is again the normal position at which the tracer is following along the lead indicia or right edge 267b of the pattern (FIG. 13). At this step level the lead-in speed signal is provided from the lead in speed potentiometer 324 through conductor 350, step level contacts C1, conductor 352 and normally closed edge transfer relay contacts 312b to the resolver speed winding 318, to drive the tracer along the lead indicia. Ground is placed on step level contacts D'1 by wiper 348d to complete a circuit for lead-contour selector relay 354 through the cycle selector switch 356. Energization of the lead-contour selector relay 354 closes its contacts 354a to complete a circuit to the edge selector relay 288 through the lead in path selector switch 332. It will be noted in the discussion hereinafter that edge selector relay 288 is energized when the tracer is following the right edge and is deenergized when the tracer is following a left edge. This relay controls the A.C. reference signals in the tracer signal circuit for modulating the lamps 282 and for mixing with the scanning signal 302 by its contacts 288a through 288d.

As the tracer moves along the right edge lead indicia, the stepping switch remains at its first step level until the code mark detector 334 views the first code mark 270a. Code mark relay contacts 338a connected to bank B step level contacts B'1 close the circuit to the stepping switch coil 346 through the circuit from plus 28 volts through reset relay contacts 360b, code mark relay contacts 338a, wiper 348b, conductor 362, diode 364, reset relay contacts 360c, interrupter contacts 346a and stepper switch coil 346 to ground. The stepper switch thus advances to step level 2 where the lead in drive signal is removed from the resolver at bank C'. The lead-contour selector relay 354 is maintained energized through bank D contacts D'2, and the stepper switch is advanced immediately to step level 3 by the circuit completed through bank B, step level contacts B'2.

At step level 3, bank D' deenergizes the lead-contour selector relay 354 which deenergizes edge selector relay 288 to select left edge following. The edge transfer relay 312 is energized by the circuit from ground through wiper 348d, step level contacts D'3, conductor 366, junction 368, conductor 370, edge transfer relay 312 and manual reset contacts 360a to plus 28 volts. The operation of edge transfer relay 312 closes contacts 312a to the steering motor 314, opens the circuit at contacts 312b to the resolver speed winding 318 and closes the circuit to the transverse winding at contacts 312c. A drive left signal is applied to the resolver transverse winding 319 through the circuit from the drive left output 328, through conductor 372, bank C' step level contacts C'3, wiper 348c, conductor 352 and contacts 312c.

When the scanning head leaves the lead indicia right edge 267b the off indicia relay 310 is deenergized to close contacts 310c connected to bank B' step level contacts B'3 to step the switch to level 4. The same connections are maintained at banks C' and D'. The switch steps to level 5 when the scanning head detects the left edge to close off indicia relay contacts 310d.

At level 5 power is removed from the resolver 316 at bank C' and bank D' actuates tool command relay 374 to enable the work tool for pattern shaping of the workpiece through the circuit from ground, wiper 348d, contact D'5, conductor 373, tool command relay 374, off indicia relay contacts 310e, manual reset contacts 360a to plus 28 volts. When the tool is in its enabled condition contacts 376 connected to bank B' step level contacts B'5 are closed to advance the switch to level 6.

A contour tracing speed signal is applied to the resolver speed winding 318 from the contour tracing speed potentiometer 326 through conductor 378 and bank C' contacts C'6. As the tracer starts to move along the contour indicia left edge 267A the code mark detector leaving the code mark 270a causes the closure of contacts 338b to step the switch to level 7.

The tracer follows around the contour indicia left edge 357a with the work tool shaping the workpiece in accordance therewith and the stepper switch maintained at level 7. Upon a redetection of code mark 270a by the code mark detector 334, code mark relay contacts 338a again close to step the switch to step level 8. Power is removed from the resolver at bank C' and the tool command relay 374 is released at bank D'. When the tool is disenabled contacts 379 connected to bank B' contacts B'8 close to actuate the stepping switch to step level 9. Edge transfer relay 312 is again actuated by bank D' to prepare the transverse winding 319 of resolver 316 and a drive right signal is applied thereto through bank C' from the drive right output 330. When the scanning head leaves the left edge, the off indicia relay contacts 310c close to advance the stepping switch to step level 10.

At level 10 the edge transfer relay 312 is maintained energized by bank D' through diode 380 and the lead-contour selector relay 354 is also energized by the circuit through diode 382, conductor 353, relay 354, cycle selector switch 356, diode 358, manual reset contacts 360a to plus 28 volts. The diodes 380 and 382 prevent the interaction of the relays 312 and 354 at the bank D' step levels D'1 through D'4 and D'11 through D'14. The energization of the lead-contour selector relay 354 prepares the circuit for lead indicia right edge tracing by closing the circuit to edge selector relay 288 at contacts 354a.

The tracer continues travelling to the right until the off indicia relay 310 indicates that the right edge has been detected and closes contacts 310d to step the switch to level 11. Edge transfer relay 312 is deenergized at level 11 bank D' to disconnect the resolver transverse winding 319 and connect speed winding 318. The switch is advanced immediately through 11 and 12 with power to the resolver being removed and stops at step level 13 whereat lead in speed signal is furnished to the resolver speed winding 318 through bank C' contacts C'13. When the tracer begins to advance along the lead indicia right edge so that the code mark detector 334 loses the code mark 270a, code mark relay contacts 338b close to step the switch to level 14 whereat the tracer is stopped and recycling of the stepper switch through the remaining levels and back to step level 1 is accomplished in accordance with the description of the first embodiment. Manual reset of the stepping switch and non-cycle operation of the device is also the same as previously described with the manual reset switch 384 and the cycle selector switch 356a performing the same functions as their counterparts in the first embodiment.

Figures 10, 12:
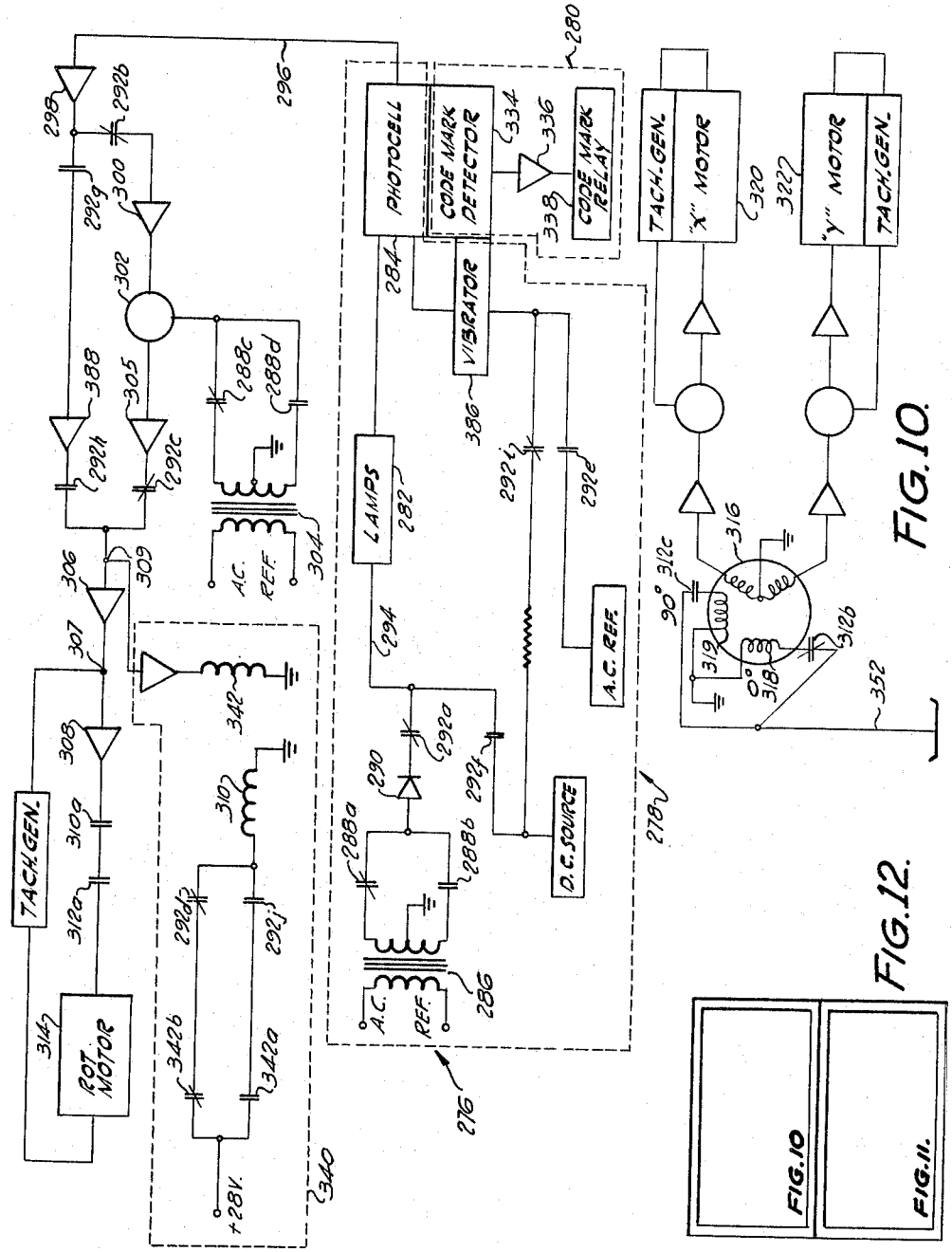
FIG. 10 is a schematic diagram of a portion of the electronic circuit for a second embodiment of this invention.
FIG. 12 is a diagram of the interrelationship of FIGS. 10 and 11.

As previously indicated the apparatus shown in FIGS. 10 and 11 may also be used to trace a pattern of the type shown in FIG. 14 in which the lead indicia 386 is formed of a thin line and the contour indicia is formed of an edge. Because of certain peculiarities in the particular circuit shown in FIGS. 10 and 11 tracing of the pattern type of FIG. 14 must be done in a direction opposite to that of FIGS. 2 and 13 as indicated by the arrows 390. Thus, the tracer follows along the lead line 386 in a counterclockwise direction as shown in FIG. 14 and the left edge 388 serves as the contour indicia.

To prepare the device for lead line and contour edge tracing, the lead in path selector switch 332 is switched to its line position. The switch 332 also reverses the polarity of the drive signals for the resolver transverse winding 319 at its switch banks 332a and 332b. This is necessary because the tracer must be driven to the right from the lead line 86 to the counter edge 388 and to the left when going back to the lead line 386 which is just opposite from the previously described example.

When the stepping switch is in its first level position and is following the lead line the circuit to the lead line relay 292 is closed by the actuation of lead contour selector relay contacts 354a and the position of lead in path selector switch 332 to its line mode. Lead line relay 292 disconnects the edge tracer portions of the tracer signal circuit by opening its normally closed contacts 292a, 292b and 292c. The closure of contacts 292e feed the A.C. reference signal to the vibrator 386 in the scanning which may take the form of an opaque shade as described in the first embodiment. Contacts 292f place a D.C. signal on the lamps 282 to eliminate noise in the photocell output signal from light flickering. Lead line relay contacts 292g and 292h complete a circuit with amplifier 388 around the edge tracer mixer 302 because the photo scanning signal of a line tracer need not be mixed with a reference signal as is required for edge tracing. Normally closed contacts 292i remove D.C. voltage from the vibrator 386 which is desirable during edge tracing to pull the opaque shade vibrator out of the optical path to the photocell 284. This of course is not required in some cases where the vibrator does not impede the image of the photocell.

The lead line relay 292 also prepares the off indicia detector circuit 340 for lead line tracing. Conversely to the edge tracing situation a signal appears at junction 309 whenever a line is being viewed by photocell 284. No signal appears at 309 if a line is not being viewed. Therefore, the connections to code mark relay 310 must be reversed by lead line relay contacts 292d and 292j as the switch is made between edge and line tracing. When a signal appears at junction 309 to indicate detection of a line the code mark enabling relay 342 is energized and the circuit to code mark relay 310 is completed through off indicia enabling relay contacs 342a and lead line relay contacts 292j. Thus the off indicia relay 310 has the same conditions for off indicia and on indicia situations regardless if a line is being followed or an edge is being followed.

The stepping switch 344 operates in substantially the same manner as described for edge tracing to control the programming of the device and a detailed explanation is therefore not necessary. The tracer is caused thereby to be guided along the lead line from contour to contour formed by the pattern edge. This mode of operation indicates the high degree of flexibility permitted by the teachings of this invention.

While apparatus has been herein described embodying the present invention in the best known manner, it is understood that modifications additions or improvements might be made without deviating from the teachings hereof. It is therefore intended that this invention be limited only by the scope of the appended claims.

What is claimed is:

1. Apparatus for tracing a pattern guide, said pattern guide having contour indicia forming a desired pattern, lead indicia forming a travel guide to and from said contour indicia, and a code mark, said apparatus comprising tracing means for automatically following along said indicia, means for detecting a code mark, and means for transferring said tracing means from one type of indicia to the other type of indicia upon detection by said code mark detection means of a code mark.

2. The apparatus of claim 1 wherein said contour indicia is a thin line and said lead indicia is a thin line.

3. The apparatus of claim 1 wherein said contour indicia comprises an edge formed by two contrasting color backgrounds and said lead indicia is a thin line.

4. The apparatus of claim 1 wherein said indicia comprise a thick line such that one edge thereof forms said contour indicia and the other edge forms said lead indicia.

5. The apparatus of claim 1 wherein said indicia are formed of thin lines, and said lead indicia merges into said contour indicia at one end thereof.

6. Apparatus for tracing a pattern guide, said pattern guide having contour indicia forming at least one closed contour, lead indicia forming a travel guide to and from said contour indicia, and a code mark forming an indicator for transferring from one indicia to another, said apparatus comprising a tracer device for detecting said code mark and automatically following along said indicia, means for transferring said tracer device from said lead indicia to said contour indicia upon detection by said tracer device of a code mark to trace about said contour, and means responsive to the subsequent detection of said code mark for transferring said tracer device from said contour indicia to said lead indicia to again follow along said lead indicia.

7. Apparatus for cutting a pattern in a workpiece in accordance with a pattern guide, said pattern guide having contour indicia forming a desired pattern, lead indicia forming a travel guide to and from said contour indicia, and at least one code mark, said apparatus comprising tracing means for automatically following along said indicia, a work tool for cutting said workpiece in accordance with a path followed by said tracing means, means for detecting said code mark, means for transferring said tracer device from one type of indicia to the other type of indicia upon detection of a code mark by said code mark detecting means, and means responsive to the detection of said code marks for enabling said work tool when said tracing means is following along a contour indicia and for disenabling said work tool when said tracer is following along a lead indicia.

8. Apparatus for cutting a pattern in a workpiece in accordance with a pattern guide, said pattern guide having contour indicia forming at least one closed contour, lead indicia forming a travel guide to and from said contour indicia, and at least one code mark, said apparatus comprising tracing means for automatically following along said indicia, a work tool for cutting said workpiece in accordance with a path followed by said tracing means, means for detecting said code mark, means responsive to a first detection of said code mark by said code mark detection means for transferring said tracer device from said lead indicia to said contour indicia and for enabling said work tool, and means responsive to a subsequent detection of said code mark for transferring said tracer device from said contour indicia to said lead indicia and for disenabling said work tool.

9. Apparatus for cutting a pattern formed of at least one separate closed contour in a workpiece, comprising a pattern guide having contour indicia forming said closed contours, lead indicia forming a travel guide to and from said contour indicia, and at least one code mark; tracing means for automatically following along said indicia; a work tool for cutting said workpiece in accordance with a path followed by said tracing means; means for detecting said code mark; means responsive to a first detection of said code mark by said code mark detection means for transferring said tracer device from said lead indicia to said contour indicia and for enabling said work tool; and means responsive to a subsequent detection of said code mark for transferring said tracer device from said contour indicia to said lead indicia, and for disenabling said work tool.

10. Apparatus for tracing a pattern formed of a plurality of separate closed contours comprising a pattern guide with thin lines forming said closed contours, a thin lead line adjacent each contour line and merging with another one of said contour lines, and a code mark adjacent each of the points of merger forming an indicator for transferring from a contour line to a lead line; a tracer device for detecting said code marks and automatically following along said one of said lead lines on to one of said contour lines to trace about said contour; and means responsive to the detection of said code mark for transferring said tracer device from said contour line to another of said lead lines.

11. The method of tracing a pattern formed of one or more separate closed contours comprising the steps of preparing a pattern guide with contour indicia forming said closed contours, lead indicia forming a travel guide to and from said contour indicia, and a code mark forming an indicator for transferring from one indicia to another; positioning over the beginning of said lead indicia a tracer device which automatically follows along indicia viewed thereby; transferring said tracer device from said lead indicia to said contour indicia to trace about said contour; and transferring said tracer device from said contour indicia to said lead indicia upon detection by said tracer device of said code mark.

12. The method of tracing a pattern formed of one or more separate closed contours comprising the steps of preparing a pattern guide with contour indicia forming said closed contours, lead indicia forming a travel guide to and from said contour indicia, and a code mark forming an indicator for transferring from one indicia to another; positioning over said lead indicia a tracer device which automatically follows along indicia viewed thereby; transferring said tracer device from said lead indicia to said contour indicia upon detection by said tracer device of a code mark to trace about said contour; and transferring said tracer device from said contour indicia to said lead indicia upon subsequent detection by said tracer device of said code mark.

13. The method of cutting a pattern in a workpiece comprising the steps of preparing a pattern guide having contour indicia defining at least one closed contour, lead indicia defining a travel guide to and from said contour indicia and a code mark adjacent said contour and lead indicia; positioning over said lead indicia a tracing device which automatically moves along said indicia and guides a work tool for cutting said workpiece in accordance with the path of movement of said tracer device; stopping said tracing device movement along said lead indicia responsive to the detection of a code mark; moving said tracing device transverse to said lead indicia towards said contour indicia; stopping said tracing device over said contour indicia; enabling said work tool to cut said workpiece; causing said tracing device to move along said contour indicia responsive to the enabling of said work tool; stopping said tracing device movement along said contour indicia and disabling said work tool responsive to a second detection of said code mark; causing said tracer device to move transverse to said contour indicia towards said lead indicia responsive to the disabling of said work tool; stopping said tracing device over said lead indicia; and causing said tracing device to move along said lead indicia.

14. Apparatus for tracing a pattern guide, said pattern guide having indicia defining a desired contour, lead indicia defining a travel guide to and from said contour indicia and a code mark adjacent said indicia; said apparatus comprising a tracing device for automatically moving long said indicia, said tracing device including photosensitive means for receiving said indicia and means including a resolver for driving said device; a code mark detector; an off-indicia condition detector; a sequence controller; means including said code mark detector for disabling said driving means to stop tracing device movement along one type of said indicia; means including said sequence controller for causing said driving means to move said tracing device transverse to said one type of indicia towards the other type of said indicia; means including said off-indicia detector for disabling said drive means to stop said tracing device over said other type indicia; and means for enabling said drive means to cause said tracing device to move along said other type indicia.

15. Apparatus for tracing a pattern guide, said pattern guide having indicia defining a desired contour, lead indicia defining a travel guide to and from said contour indicia and a code mark adjacent said indicia; said apparatus comprising a tracing device for automatically moving long said indicia, said tracing device including photosensitive means for viewing said indicia and means including a resolver for driving said device; a code mark detector; an off-indicia condition detector; a sequence controller; means including said code mark detector and including said sequence controller for disabling said driving means to stop tracing device movement along one type of said indicia; means including said sequence controller for causing said driving means to move said tracing device transverse to said one type indicia towards the other type of said indicia; means including said off-indicia detector and said sequence controller for disabling said drive means to stop said tracing device over said other type indicia, and means including said sequence controller for enabling said drive means to cause said tracer to move along said other type indicia.

16. Apparatus for cutting a pattern in a workpiece in accordance with a pattern guide, said pattern guide having contour indicia defining at least one closed contour, lead indicia defining a travel guide to and from said contour indicia and a code mark adjacent said contour and lead indicia; said apparatus comprising a tracing device for automatically moving along said indicia, said tracing device including photosensitive means for viewing said indicia and means including a resolver for driving said device; a work tool for cutting said workpiece in accordance with the path of movement of said tracer device; a code mark detector; an off-indicia condition detector; means responsive to the detection of a code mark by said code mark detector for disabling said driving means to stop tracing device movement along said lead indicia; means for causing said driving means to move said tracing device transverse to said lead indicia towards said contour indicia; means including said off-indicia detector for disabling said drive means to stop said tracing device over said contour indicia; and for enabling said work tool to cut said workpiece; means responsive to the enabling of said work tool for enabling said drive means to cause said tracing device to move along said contour indicia; means responsive to a second detection of said code mark for disabling said driving means to stop tracing device movement along said contour indicia and disabling said work tool; means responsive to the disabling of said work tool for causing said drive means to move said tracing device transverse to said contour indicia towards said lead indicia; means including said off-indicia detector for disabling said driving means to stop said tracing device over said lead indicia; and means for enabling said driving means to cause said tracer device to move along said lead indicia.

17. Apparatus for cutting a pattern in a workpiece in accordance with a pattern guide, said pattern guide having contour indicia defining at least one closed contour, lead indicia defining a travel guide to and from said contour indicia and a code mark adjacent said contour and lead indicia; said apparatus comprising a tracing device for automatically moving along said indicia, said tracing device including photosensitive means for viewing said indicia and means including a resolver for driving said device; a work tool for cutting said workpiece in accordance with the path of movement of said tracing device; a code mark detector; an off-indicia condition detector; a sequence controller; means including said sequence controller and responsive to the detection of a code mark by said code mark detector for disabling said driving means to stop tracing device movement along said lead indicia; means including said sequence controller for causing said driving means to move said tracing device transverse to said lead indicia towards said contour indicia; means including said off-indicia detector and said sequence controller for disabling said drive means to stop said tracing device over said contour indicia and for enabling said work tool to cut said workpiece; means including said sequence controller responsive to the enabling of said work tool for enabling said drive means to cause said tracing device to move along said contour indicia; means including said sequence controller responsive to a second detection of said code mark for disabling said driving means to stop tracing device movement along said contour indicia and for disabling said work tool; means including said sequence controller responsive to the disabling of said work tool for causing said drive means to move said tracing device transverse to said contour indicia towards said lead indicia; means including said off-indicia detector and said sequence controller for disabling said driving means to stop said tracing device over said lead indicia; and means including said sequence controller for enabling said driving means to cause said tracing device to move along said lead indicia.

18. Apparatus for cutting a pattern in a workpiece in accordance with a pattern guide, said pattern guide having thin lines defining a plurality of closed contours, a thin lead line adjacent each contour line and merging with another one of said contour lines and a code mark adjacent said contour and lead indicia; said apparatus comprising a tracing device for automatically moving along said lines, said tracing device including photosensitive means for viewing said lines and means including a resolver for driving said device; means for cutting said workpiece in accordance with the path of movement of said tracing device; a code mark detector; an off-line condition detector; a sequence controller; means including said sequence controller and responsive to the detection of a code mark by said code mark detector as said tracer moves along one of said lead lines for disabling said driving means to stop said tracing device at a point of merger with one of said contour lines; means including said sequence controller for enabling said work tool to cut said workpiece; means responsive to the enabling of said work tool and including said sequence controller for enabling said drive means to cause said tracing device to move along said contour line; means responsive to a second detection of said code mark and including said sequence controller for disabling said driving means to stop tracing device movement along said contour line and for disabling said work tool; means responsive to the disabling of said work tool and including said sequence controller for causing said drive means to move said tracing device transverse to said contour line towards another of said lead lines; means including said off-line detector and said sequence controller for disabling said driving means to stop said tracing device over said lead line; and means including said sequence controller for enabling said driving means to cause said tracing device to move along said lead line.

19. The method of tracing a pattern guide, said pattern guide having contour indicia forming a desired pattern, lead indicia forming a travel guide to and from said contour indicia, and a code mark, comprising the steps of tracing along one type of said indicia, detecting said code mark while tracing along said one type of indicia and transferring from said one type of indicia to the other type of indicia upon detection of said code mark.

20. The method of cutting a pattern in a workpiece in accordance with a pattern guide, said pattern guide having contour indicia forming a desired pattern, lead indicia forming a travel guide to and from said contour indicia, and at least one code mark, comprising the steps of tracing along one type of said indicia, guiding a work tool in accordance with the tracing movement, detecting a code mark while tracing along said one type of indicia, transferring said tracing means from the one type of indicia to the other type of indicia upon detection of a code mark, enabling said work tool to cut said workpiece while tracing along said contour indicia, and disabling said work tool while tracing along said lead indicia.

No references cited.

WILLIAM W. DYER, Jr., *Primary Examiner.*

G. A. DOST, *Assistant Examiner.*